Oct. 25, 1960     C. L. ASHBROOK     2,957,495
FLUID MIXING DEVICE
Filed June 19, 1958
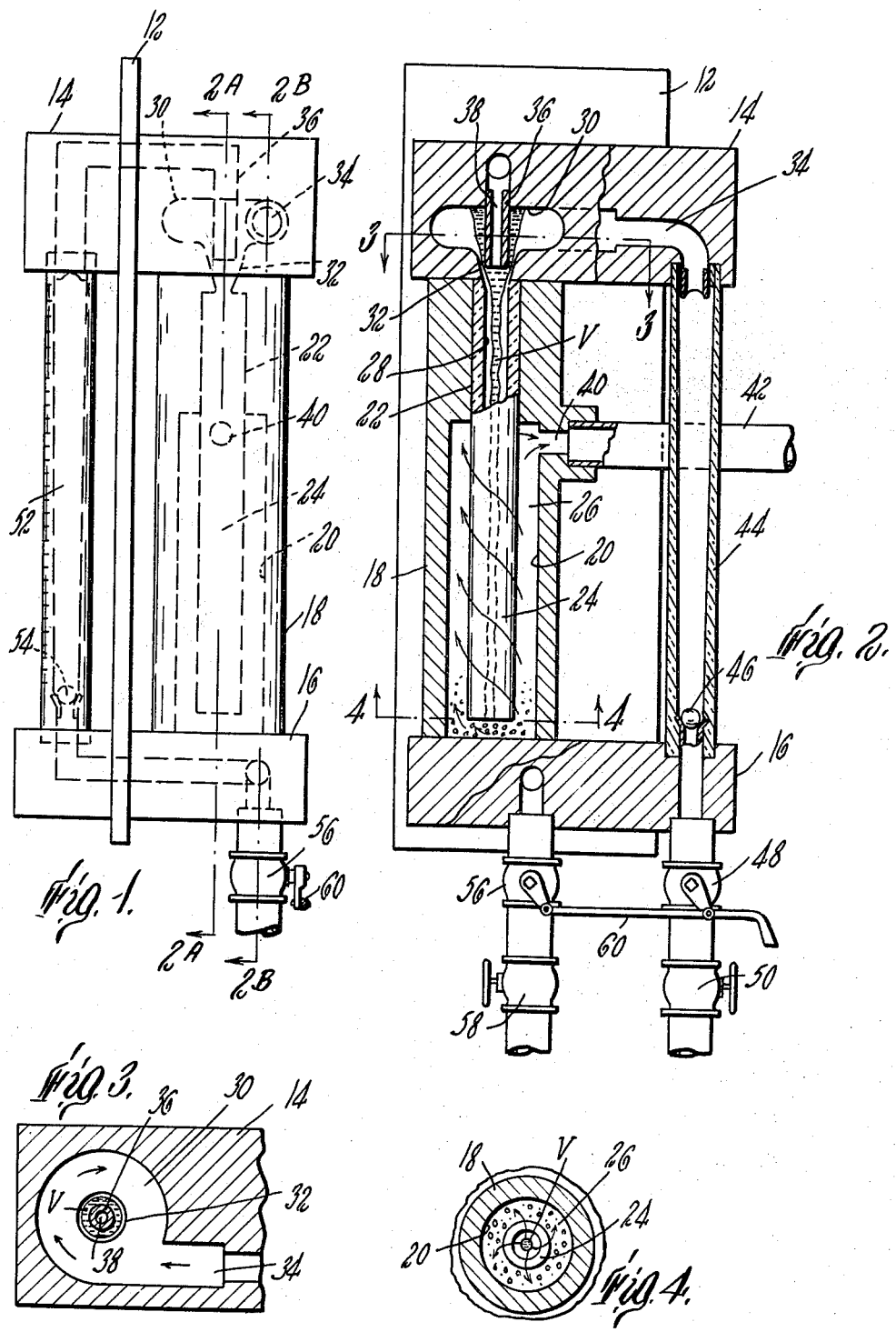

2,957,495
Patented Oct. 25, 1960

2,957,495
FLUID MIXING DEVICE

Clifford L. Ashbrook, % Gun Products, Inc., 4112 Fannin St., Houston, Tex.

Filed June 19, 1958, Ser. No. 743,126

2 Claims. (Cl. 137—604)

This invention relates to the mixing of fluids or other flowable materials with one another and more particularly to a novel device especially adapted for mixing a liquid with a gas or another liquid.

It is frequently desirable to mix fluids with one another. For example, in the chlorination of water for purification, chlorine gas must be dissolved in water in measured quantity. A similar problem exists in the carbonation of water for beverage purposes, as well as in the solution of other gases and liquids with one another. In many applications, however, not only must a predetermined ratio of gas to liquid or liquid to liquid be maintained, but it is important that a true solution or other heterogeneous mixture be produced as a result of the mixing process. Although such can readily be accomplished under laboratory conditions, as a batch process, when the mixing process must be carried out to provide a continuously flowing stream or solution or other heterogeneous mixture, certain problems arise which make difficult the complete mixing without the utilization of power-operated propeller stirrers and the like. This has, as a practical matter, limited the development of simple, unattended, foolproof mixing devices such as are most desirable, for example, in the chlorination of water on a small scale for home use.

According to the present invention, however, an effective, yet simple continuous mixing device is provided for mixing fluids in predetermined ratio. Furthermore, the device of the invention is operated solely by the pressurization of one of the fluids to be mixed, commonly available water pressure when the device is used for chlorination. This has been done by creating a whirling body of one of the fluids with a central vortex and introducing the other fluid into such vortex to provide an elongated general cylindrical contact area between the fluids, and thereafter destroying the vortex to achieve complete mixing. This latter effect is accomplished by the unique utilization of a retroverted path of flow, preferably a path of flow wherein the whirling body of fluid moves radially outwardly for a short distance and then upwardly in the form of a whirling annular body surrounding the vortex, so that it is, in effect, turned inside out.

Structurally, this preferred flow pattern is created by means of an inner central tubular member providing an elongated central chamber having at its inlet end a tangentially directed opening for a first fluid and an axially directed opening for a second fluid. An outer tubular member concentric therewith and having an outlet for the mixed fluids at one end thereof surrounds the inner tubular member, with the outlet end of said inner member terminating adjacent the opposite end wall of the outer tubular member to provide retroverted flow through the annular chamber between the inner and outer tubular members to the outlet of the device.

It is another object of the invention to provide means for mixing fluids in a predetermined ratio, preferably by providing valve means both for individually setting flow rates of each of the fluids to be mixed, further including common means for controlling the fluid inputs together so that the rate of discharge of mixed fluid can be varied both individually, or together without substantially changing the ratio of its components. In addition, flow rate measuring means interposed between the valve means and the mixing device per se may be provided for each of the fluids.

Various additional objects and features of the invention will become apparent in connection with the following detailed description of a preferred embodiment thereof, together with the accompanying drawings, wherein:

Fig. 1 is a side elevation of the mixing device of the invention;
Fig. 2 is a side section of the mixing device of Fig. 1 taken on the lines 2A—2A and 2B—2B thereof, also showing its operation, and
Figs. 3 and 4 are partial sections of the mixing device of Fig. 1 taken, respectively, on the lines 3—3 and 4—4 of Fig. 2.

Referring to the drawings, the preferred structure according to the present invention includes a flat base member 12 having mounted thereon a pair or spaced end blocks 14 and 16 with an outer elongated cylindrical member 18 extending therebetween. Such outer cylindrical member has at its lower end abutting lower end block 16 an elongated central bore 20 with a reduced bore 22 at its opposite end for receiving one end of a cylindrical inner tubular member 24 which extends downwardly toward lower end block 16, terminating adjacent to but short of the upper surface thereof. The outer surface of said inner member 24 is spaced from the inner wall of outer tubular member 18 to provide an annular chamber 26 in communication with the central bore 28 of inner tubular member 24. The upper end block 14 has an enlarged cylindrical chamber 30 concentric with the inner member 24 and connected to its bore 28 by a central conical passage 32, so that said chamber 30, passage 32 and bore 28 form an elongated central chamber having throughout the major portion of its length a length to diameter ratio of about 20:1, although a lesser ratio will serve in many applications when easily mixed or dissolved fluids are to be handled. The annular chamber 26 should have a cross-sectional area restricted enough so that relatively high fluid velocities are maintained for efficient mixing, and may be of about ten times the area of bore 28 with a length to diameter ratio of about 3:1, as shown.

For introducing into chamber 30 the fluids to be mixed, suitable inlet openings are provided, one of said openings consisting of a bore 34 through upper block 14 directed tangentially of chamber 30, and the other of said openings comprising a tube 36 having a bore 38 extending downwardly through said block 14 and chamber 30 into its passage 32 and terminating therein, so that an annular area is formed therearound for the movement of fluid from chamber 30 into the bore 28 of inner member 24. The first fluid is introduced through tangential bore 34 and the second fluid is introduced through the axial bore 38 centrally of inner member bore 28. An outlet for the mixed fluids is provided in outer member 18 at the upper end of annular chamber 26, such outlet comprising a bore 40 extending radially through the wall of outer member 18, together with an outlet tube 42.

For controlling the input of fluids into the inlet openings, both to establish a predetermined ratio thereof and to control the flow from outlet tube 42, each of the inlets is provided with a flowmeter and an individual control valve, as well as a control valve linked to a similar valve in the other inlet line for common control. Thus, the tangential fluid inlet comprising bore 34 has connected thereto a well-known flowmeter consisting of an upwardly diverging tube 44 having a ball 46 therein, the tube being mounted between end blocks 14 and 16 and being connected at its lower end to a common control valve 48 and an independent control valve 50. The axial fluid inlet is similarly arranged, its tube 36 being connected to an upwardly diverging tube 52 having a ball 54 therein, which is, in turn, connected to a common control valve 56 and an independent control valve 58. Control valves 48 and 56 are connected together with a common linkage 60 so that they may be simultaneously operated.

Assuming, as a typical example, that chlorine gas is to be mixed with water, the source of water under conventional available pressures of up to about 100 p.s.i. is connected to valve 50 and the source of chlorine under low pressure to valve 58. The common linkage 60 in then operated to open valves 48 and 56 and the independent valves 50 and 58 are adjusted with the aid of the rates of flow as indicated by the heights at which balls 46 and 54 are floated to establish a desired predetermined ratio of the fluids to be mixed. The water flowing into chamber 30 through tangential bore 34 creates a whirling body of liquid as shown by the arrows in the drawings, such whirling body of liquid at any substantial rate of flow creating a central vortex V which extends axially for the entire length of the inner chamber along bore 28 to the end of inner member 24, as may be seen in Figs. 2 and 3. The whirling helical movement of the water as it moves along the surface of bore 28 exposes a large cylindrical surface area for solution of the chlorine gas fed into the device through tube 36, and in fact, creates a negative pressure in bore 38 of said tube so that the device of the invention is useful as a suction pump as well as a mixer. At the end of inner member 24, however, the vortex V is destroyed as the fluid moves radially outwardly toward the wall of annular chamber 26, at the same time reversing its direction of flow so that it moves helically upwardly through said annular chamber toward outlet bore 40, as may be seen in Figs. 2 and 4. The positive destruction of the vortex V, although in practice creating a few bubbles in the region of the lower end of inner member 24, provides a substantially homogeneous mixture, even of air and water, as soon as the mixture has progressed as little as one-third of the distance upwardly through annular chamber 36, as shown in Fig. 2. The whirling movement of the fluid throughout its entire path, including its reverse path through the annular chamber, as shown by the arrows in Fig. 2, together with the employment of a retroverted path in which the fluid stream is, in effect, turned inside out to completely destroy the vortex V formed in the inner flow path, is responsible for the extraordinarily effective mixing by the structure of the invention so that a compact self-powered device is provided.

Various modifications within the spirit of the invention and the scope of the appended claims will occur to those skilled in the art.

I claim:

1. A device for mixing fluids comprising an inner tubular member and a surrounding outer tubular member mounted thereon at a position spaced from the outlet end of said inner tubular member, said inner tubular member providing an elongated central chamber having at its inlet end a tangentially directed first inlet opening for introducing a first fluid into said inner tubular member and creating a whirling body of said first fluid with an axially extending central vortex as said first fluid passes through said central chamber and a second inlet opening for directing a stream of a second fluid into the vortex of the whirling body of said first fluid, said surrounding outer elongated tubular member, being spaced outwardly from said inner tubular member of provide an enclosed annular chamber in communication with said inner tubular member, said outer tubular member further having an end wall adjacent said mounting position and having an outlet opening adjacent said end wall thereof, the outlet end of said inner tubular member terminating adjacent the opposite end wall of said outer tubular member, said opposite end wall of the outer tubular member being closed off so that said fluids move radially outwardly from the end of said inner tubular member and said central vortex is destroyed and the mixing of said fluids is completed while said fluids move in a helical path along the annular chamber between said inner and outer tubular members to said outlet opening of said outer tubular member.

2. A device as claimed in claim 1 wherein said inner tubular member is cylindrical and said outer tubular member has a cylindrical chamber concentric with said inner tubular member.

References Cited in the file of this patent
UNITED STATES PATENTS

| | | |
|---|---|---|
| 1,036,871 | Matheson | Aug. 27, 1912 |
| 1,138,202 | Erlwein | May 4, 1915 |
| 1,517,598 | Stevenson | Dec. 2, 1924 |
| 2,235,998 | Kleinschmidt | Mar. 25, 1941 |
| 2,465,628 | Border | Mar. 29, 1949 |
| 2,523,800 | Woodson | Sept. 26, 1950 |
| 2,778,223 | Kimbrell | Jan. 22, 1957 |

FOREIGN PATENTS

| | | |
|---|---|---|
| 893,350 | France | Jan. 24, 1944 |